June 27, 1961 H. U. LIEBERHERR 2,989,840
SUPERCHARGED INTERNAL COMBUSTION ENGINES
Filed July 18, 1957 5 Sheets-Sheet 1

FIG. I

INVENTOR.
HANS ULRICH LIEBERHERR

June 27, 1961   H. U. LIEBERHERR   2,989,840
SUPERCHARGED INTERNAL COMBUSTION ENGINES
Filed July 18, 1957   5 Sheets-Sheet 2

INVENTOR:
HANS ULRICH LIEBERHERR

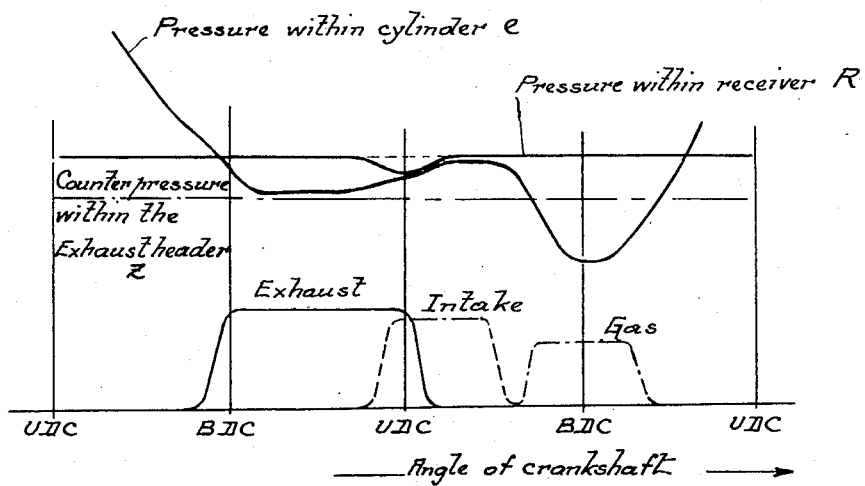
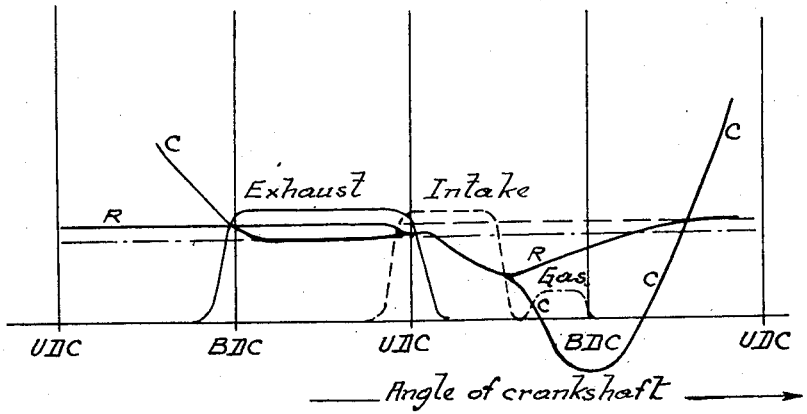

United States Patent Office 2,989,840
Patented June 27, 1961

2,989,840
SUPERCHARGED INTERNAL COMBUSTION ENGINES
Hans Ulrich Lieberherr, Paris, France, assignor to S.O.B.E.M. Societe de Brevets et d'Etudes de Moteurs, Paris, France, a company of France
Filed July 18, 1957, Ser. No. 672,678
Claims priority, application France Aug. 8, 1956
2 Claims. (Cl. 60—13)

The present invention relates to improvements in supercharged internal combustion engines, of the four-stroke type.

It can be applied to diesel engines or dual-fuel engines in which ignition is effected by the heat of the compressed air contained in the cylinder, as well as to engines with electric spark or other ignition such as gas engines or engines operating with mixtures of air and combustible vapours.

Its purpose is to obtain specific outputs which are superior to those achieved on engines supercharged according to known methods, while maintaining the mechanical and thermal loads within safe limits.

A supercharged engine built according to the invention and comprising a crankshaft, an exhaust gas turbine, a supercharging blower, the latter two elements constituting an exhaust gas driven turbo-compressor, a heat exchanger for cooling precompressed air, a general header for said cooled pre-compressed air is characterised by receivers for pre-compressed air between said header and the cylinders, or a group of cylinders, and air-flow control members between the header and the receivers.

The supercharging blower compresses the atmospheric air, in one or several stages, to a pressure higher than that required in the cylinder at the beginning of the compression stroke. This highly precompressed air leaves the blower at a high temperature and can easily be cooled, in the heat exchanger, to a temperature close to that of the refrigerating fluid. The above mentioned receivers are therefore filled with highly compressed air at low temperature. During the scavenging period, viz when the intake and exhaust valves are open simultaneously, the contents of these receivers discharge partially through the cylinder, thus expelling the residual gases.

At the end of scavenging, the pressure within the cylinder is essentially that prevailing in the receiver and close to that prevailing in the exhaust header. The piston then expands the air contained in the cylinder as well as that enclosed within the receiver. At the end of the stroke, the cylinder contains air at the desired pressure, lower than that at the supercharging blower discharge, and at a temperature lower than that at the heat exchanger outlet.

Starting from the same air pressure as in a conventional engine, the temperature of the air is lower and consequently its density is higher. A greater quantity of fuel can therefore be burnt and more power can be developed, without increasing the mechanical load (since the relatively low pressures of conventional engines are maintained), and without increasing the thermal load, since the cylinders are operating at low air temperatures.

Other features and advantages of the present invention will appear from the following description with reference to the accompanying drawings in which:

FIGURES 2, 3, 2a and 3a are diagrams explaining the operation of engines designed in accordance with the invention;

Figure 1:
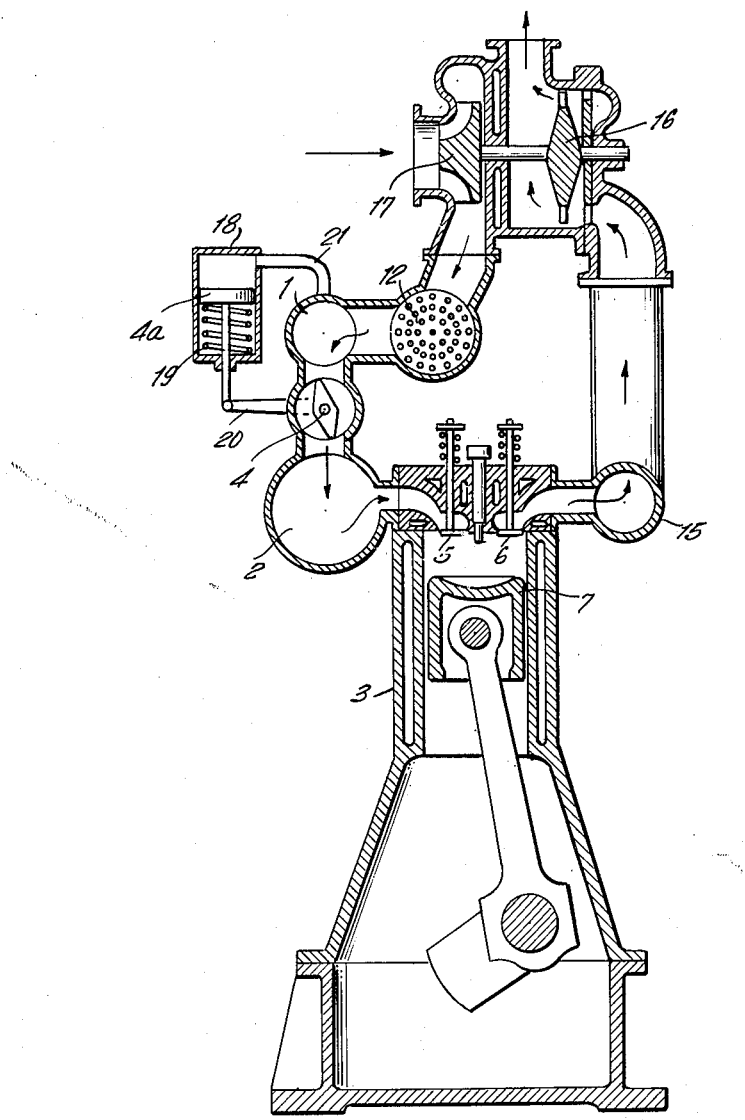
FIGURE 1 shows a four-stroke diesel engine according to the invention.

Like reference numerals apply to like elements throughout the figures. Numerals 17, 12 and 1 designate a supercharging blower, an intercooler and a header for precompressed air, blower 17 being driven by an exhaust gas turbine 16; reference 15 designates an exhaust header.

Referring more particularly to FIG. 1, a control valve 4, the position of which varies with the supercharging pressure on the piston 4a mechanically connected to the said valve, is installed between the general header 1 for precompressed air and an individual air receiver 2 connected to the cylinder 3 of a four-stroke diesel engine.

Piston 4a sliding in cylinder 18, is submitted, on one side, to the pressure of the air in general header 1 through the medium of conduit 21, and, on the other side, said piston 4a rests on spring 19. To each value of the air-pressure in header 1 will therefore correspond a definite position of piston 4a. The motion of said piston 4a causes the control valve 4 to move, through the medium of an arm 20. The higher the pressure within header 1 is, the more the control valve 4 will throttle the air-flow between general header 1 and the air-receiver 2.

Figure 2:
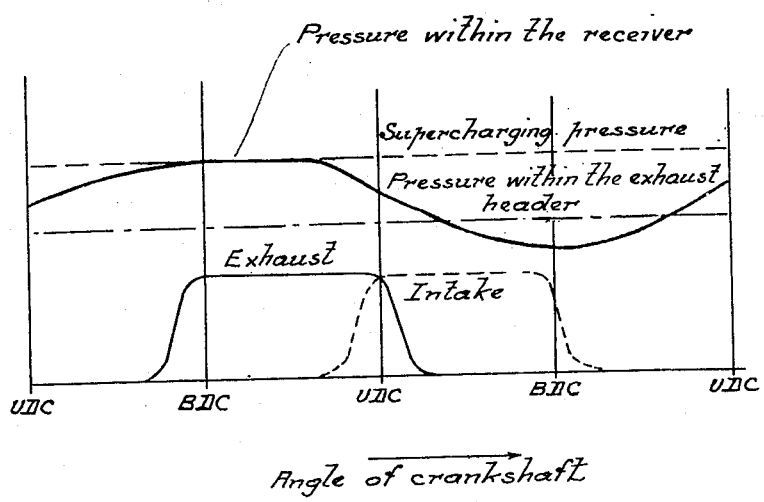

FIG. 2 shows the pressure cycle resulting from this arrangement in a compression-ignition engine at full load where the throttling in the control valve 4 is maximum. In order to understand the ensuing effects, it is advantageous to assume that the receiver 2 (located upstream of intake valve 5) is filled with compressed air at the moment the scavenging starts and that the control valve 4 is temporarily closed. While scavenging lasts, in other words as long as the intake valve 5 and exhaust valve 6 are simultaneously open, the receiver 2 discharges into the cylinder 3 and expels the residual gases. Once the exhaust valve 6 is closed, the piston 7 continues its downward-stroke and expands the air contained in the cylinder 3 and in the receiver 2. By adequate dimensioning of the volume of the receiver, the desired pressure is attained at the end of the stroke, near the moment of closure of the intake valve 5. From that moment on, the piston 7 compresses the low pressure, low temperature air. At the end of the stroke, the injection of fuel and the ignition take place as in a conventional engine. The compression ratio is that which permits safe ignition for the initially existing conditions of pressure and temperature. It is essentially the same as in diesel engines of known design.

At the end of the intake stroke, the receiver 2, when considered separately, contains air at low pressure and low temperature. As the intake stroke lasts about one fourth of the duration of a complete cycle, the receiver can be filled during the remaining thre quarters of the duration of a cycle. It is, therefore, possible to keep the control valve 4 constantly open at a fixed position, sufficient for permitting filling and still not important enough to permit an excessive air inflow during the downward movement of the piston. The restricted continuous inflow of air during the intake stroke even allows the use of a receiver volume of less importance than with a completely closed valve.

This arrangement therefore enables a different pressure to be obtained between the supercharging pressure and that prevailing at the beginning of the compression, ensuring simultaneously scavenging at high pressure, and all this with extremely simple and safe means. In particular, there is no need for variable timing of the opening and closing of the intake valves as in other known devices.

Figure 3:
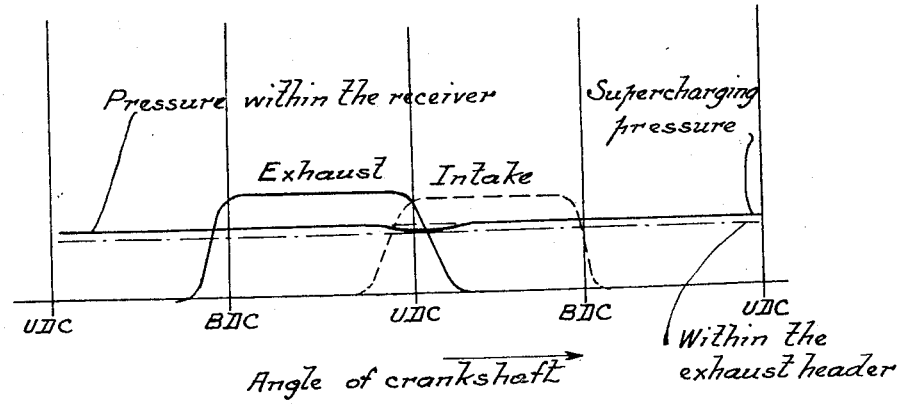

At reduced load such as shown in FIG. 3, there is no fear concerning an excessive mechanical or thermal load, so that the control valve 4 may remain fully open and that the cylinder 3 may be filled to the full supercharging pressure still available at this partial load.

The same cycle applies to a dual-fuel engine where a mixture of air and gas is ignited by self-ignition of a small amount of pilot liquid fuel.

In a spark-fired gas engine, the operation is different. Compared to a compression ignition engine, it is necessary to reduce the effective-compression rate so as to avoid self-ignition, and to maintain the rate of air-gas mixture within the ignition limits at all loads. Preferentially, the mixture should be held constant. Mechanism 4a is modified whereby high pressure air operates against bottom side of servomotor piston 4a and the spring 19 is placed on the top side of the cylinder 18.

Accordingly, at full load, (FIG. 2a), the regulating valve 4 is kept completely open and the expansion of the air introduced into the cylinder is effected by closing the intake valve 5 prior to the end of the stroke. The enclosed air is thus expanded and recompressed, so that the effective compression stroke can be defined as the part of the stroke between the point symmetrical to that of the closure of the intake valve 5 and the upper dead centre. The temperature of the mixture, at the end of the compression stroke, can thus be maintained within safe limits. The ressure is lowest when the piston is at the bottom dead centre and the combustible gas is introduced into the cylinder during this part of the cycle.

At low load (FIG. 3a), the control valve 4 is partially closed and immediately after scavenging expansion in the cylinder 3 and receiver 2 will take place until the moment of closure of the intake valve 5. Near the moment of closure of this valve, the cylinder contains a smaller weight of air than at full load, on the one hand, on account of the reduction of the pressure, at the outlet of supercharger 17, and on the other hand, because it has already been expanded within the cylinder. Consequently, the air content in the cylinder can be adjusted to the amount of gas necessary for operating the engine at the given load. Again, scavenging (particularly impartant in a gas engine, in order to avoid self-ignition) is effected at the full supercharging pressure available in header 1 and consequently under the very best conditions.

According to another embodiment of the invention, shown in FIG. 4 and applying again to a diesel engine, rotating valve 4 is used to keep closed the passage between the general header 1 and the air receiver 2 during the intake-stroke, at full load; on the reverse, said passage must remain open, at no load or at reduced load, during the intake stroke. Therefore, the valve 4 must occupy different positions, with respect to the crankshaft, according to load. This is achieved by means of the train of gears 9 to which valve 4 is connected through the medium of chain 10. Said train of gears 9 comprises a fixed pinion 22 on the crankshaft 8 and a driving wheel 23, loose on said crankshaft, driven through the medium of pinion 24 fixed on a fork 8a, also loose on the crankshaft.

By moving the fork 8a by means of servomotor 25, one obtains a change in the relative positions of wheels 22 and 23, which results in dephasing valve 4 with respect to the crankshaft; said servomotor 25 comprises a cylinder 26, a piston 27 and a rod 28; by means of conduits 29, 30, it is connected to valve 11 which comprises a cylinder 31, two pistons 32 and 33 and a rod 34; numeral 35 designates an inlet for oil under pressure and numerals 37 and 36 two outlets for oil; valve 11 is controlled by piston 4a, the upper part of which is submitted to the pressure of the air coming from blower 17 through conduit 38.

The above device operates as follows:

Whenever the air pressure in conduit 38 increases, it lowers piston 4a until a new equilibrium be reached. In its turn, the downward motion of piston 4a lowers rod 34 of valve 11; the piston 33 uncovers conduit 30; thus, oil under pressure coming from 35 is introduced into the cylinder of servomotor 25, under piston 27, which causes the latter to move upwards. The oil above piston 27 is directed towards the exhaust 36, through conduit 29 which is uncovered in view of the downward motion of piston 32. The upward motion of piston 27 brings back pistons 32 and 33 to their closed position, through the medium of lever 39. At the same time, the upward motion of piston 27 results (through the medium of rod 28, fork 8a and pinion 24) in a dephasing of wheels 22 and 23 and, therefore, in a dephasing of valve 4 with respect to the crankshaft.

The reverse movement takes place when pressure within conduit 38 decreases.

Figure 5A:
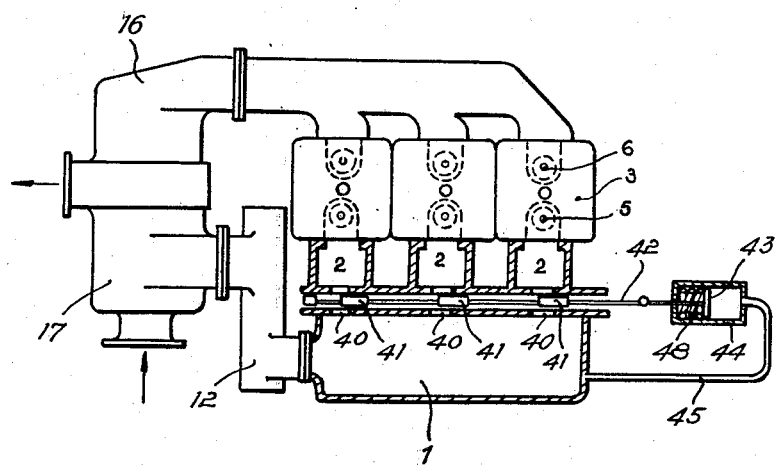
FIGURES 5a and 5b show two types of connection between the engine cylinders and the general header.
Figure 5B:
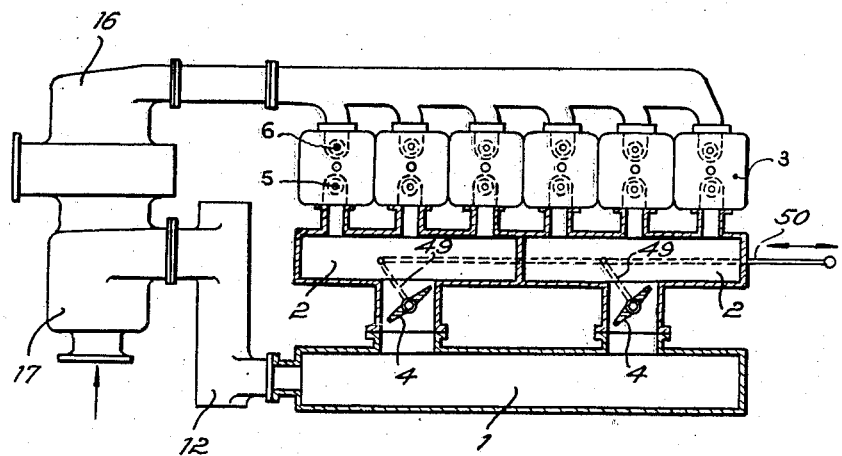

In FIGURES 5a and 5b are shown two possible embodiments of the connection between the engine cylinders 3 and the general header 1.

In FIGURE 5a, each cylinder 3 is equipped with a separate air-receiver 2; openings 40 provided with throttle valves 41 connect these receivers 2, to the general header 1, which receives precompressed cooled air from the charging air intercooler 12. The throttle valves 41 are secured to a rod 42 which is actuated by a piston 43 according to the position of equilibrium between the air pressure in cylinder 44, provided by pipe 45 from header 1, and a spring 48.

It can be advantageous to use the same air-receiver for two or a group of cylinders, whether the cycles of these cylinders are synchronous, or whether they are sufficiently spaced in phase so as not to influence each other nor to impair the filling of the receiver between two scavenging periods.

Figure 4:
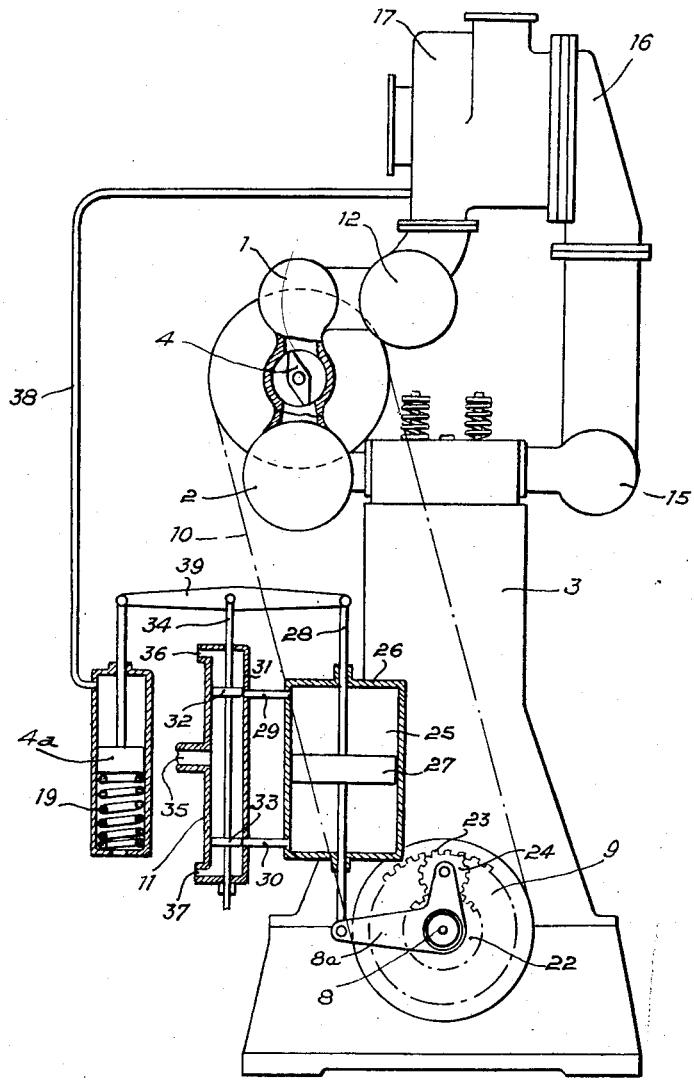
FIGURE 4 shows an alternate form of embodiment in which the admission of fresh air is interrupted during the intake stroke.

In this connection, FIGURE 5b shows a 6 cylinder engine, wherein two groups of three cylinders 3 are each connected to a common air-receiver 2, and the two receivers 2 are in communication with header 1 through two valves 4 actuated by lever 49 and rod 50 by an actuating device similar to that of FIGURES 1 and 4.

The above description has been given in an explanatory and by no means restrictive manner and the above mentioned forms of embodiment may be combined in various ways, as well as there may exist others in conformity with the invention.

The exhaust gas turbine 16 may be used for driving the supercharging blower 17, thus constituting a turbo-compressor, but the turbine and the blower may be individually connected to the engine, by mechanical means, or even the engine may be used entirely for driving the blower, the useful power being supplied by the exhaust gas turbine.

Regarding the control valve 4, it may be actuated not only according to the supercharging air pressure, but also according to the position of the governor in the case of a stationary engine, to the position of the fuel control lever on a marine engine, to the intensity of current required by the users on a generating set, in short of any factor determining the load of the engine or determined by said load.

I claim:

1. A supercharged internal combustion four-stroke engine comprising a crankshaft, a plurality of cylinders for driving said crankshaft, an exhaust gas driven turbo-compressor driven by the exhaust gases from said cylinders, a heat exchanger connected to said turbo-compressor for cooling precompressed air received from said turbo-compressor, a general header for said cooled precompressed air connected to said heat exchanger, and respective intake members connected to said general header for admitting air into each of the engine cylinders, respectively, receivers for said precompressed air, each of said receivers being located between said header and said intake members, air flow throttling control means including a passage disposed between said header and said receivers, and means for varying the cross-section of said passage to control flow from said header to said receivers, said varying means being responsive to a factor connected to the load of the engine.

2. A supercharged internal combustion four-stroke engine comprising a crankshaft, a plurality of cylinders for driving said crankshaft, an exhaust gas driven turbo-compressor driven by the exhaust gases from said cylinders, a heat exchanger connected to said turbo-compressor for cooling precompressed air received from said turbo-compressor, a general header for said cooled precompressed air connected to said heat exchanger, and respective intake members connected to said general header for admitting air into each of the engine cylinders respectively, receivers for said precompressed air, each of said receivers being located between said header and said intake members, air flow throttling control means including a passage disposed between said header and said receivers, a valve in said passage for varying the cross-section thereof to control flow from said header to said receivers, a control cylinder connected to said header, a piston in said cylinder connected to said valve, and a spring in said cylinder engaging said piston for opposing pressure on said cylinder from said header so that said control means is responsive to the output pressure of said turbo-compressor.

References Cited in the file of this patent

UNITED STATES PATENTS

| | | |
|---|---|---|
| 2,336,844 | Buck | Dec. 14, 1943 |
| 2,388,350 | Taylor | Nov. 6, 1945 |
| 2,540,916 | Sparrow | Feb. 6, 1951 |

FOREIGN PATENTS

| | | |
|---|---|---|
| 849,935 | Germany | Sept. 18, 1952 |